350-374 SR

XR 4,170,772

United States 4,170,772

Bly Oct. 9, 1979

[54] FLAT PANEL DISPLAY WITH FULL COLOR CAPABILITY

[75] Inventor: Vincent T. Bly, Alexandria, Va.

[73] Assignee: The United States of America as represented by the Secretary of the Army, Washington, D.C.

[21] Appl. No.: 900,204

[22] Filed: Apr. 26, 1978

[51] Int. Cl.[2] ........................ H05B 33/00; G02F 1/13

[52] U.S. Cl. ............................ 340/781; 340/166 EL; 340/701; 340/783; 340/752; 350/150; 358/59; 358/241

[58] Field of Search ....... 340/324 M, 324 R, 166 EL, 340/781, 783, 784; 315/169 TV; 358/59, 241; 250/553; 350/150

[56] References Cited

U.S. PATENT DOCUMENTS

| | | | |
|---|---|---|---|
| 3,566,014 | 2/1971 | Norem | 358/241 X |
| 3,675,220 | 7/1972 | Snaper et al. | 350/150 X |
| 3,840,695 | 10/1974 | Fischer | 350/150 X |
| 4,051,465 | 9/1977 | Brody | 340/324 M |

*Primary Examiner*—David L. Trafton

*Attorney, Agent, or Firm*—Nathan Edelberg; Milton W. Lee; Max L. Harwell

[57] ABSTRACT

A color capability flat panel display comprised of the combination of two semi-independent linear displays. One of the displays is an active light emitting linear display and the other display is a passive light modulating linear display wherein both of the linear displays are orthogonally aligned on opposite sides of an optically thin dielectric spacer. The active display may be an electroluminescent panel comprised of opaque linear electrodes on the back side and a common transparent electrode that is contiguous with the dielectric spacer on the front side. A plurality of vertical color electroluminescent phosphor stripes are sandwiched between the horizontal electrodes and the transparent electrode. The passive display is comprised of electronic birefringent electro-optical material having linear interdigital surface electrodes thereon sandwiched between two orthogonal dichroic polarizers.

15 Claims, 1 Drawing Figure

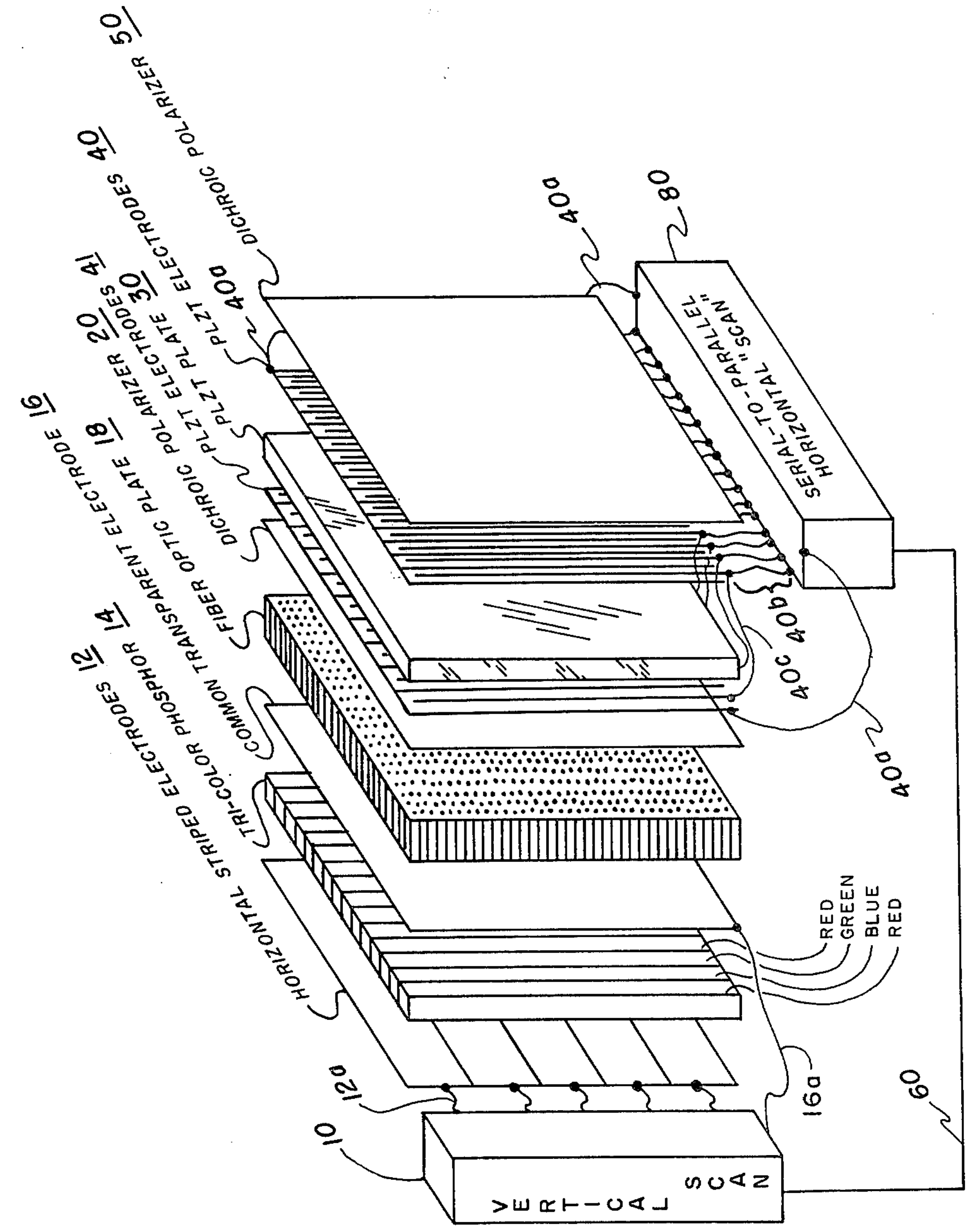
HORIZONTAL STRIPED ELECTRODES 12
TRI-COLOR PHOSPHOR 14
COMMON TRANSPARENT ELECTRODE 16
FIBER OPTIC PLATE 18
DICHROIC POLARIZER 20
PLZT PLATE 30
DICHROIC POLARIZER 50
40a
40b
40c
80
SERIAL-TO-PARALLEL HORIZONTAL "SCAN"
RED
GREEN
BLUE
RED
10
12a
16a
60
VERTICAL SCAN

FLAT PANEL DISPLAY WITH FULL COLOR CAPABILITY

The invention described herein may be manufactured, used, and licensed by the U.S. Government for governmental purposes without the payment of any royalties thereon.

BACKGROUND OF THE INVENTION

The present invention is in the field of flat panel video type displays that have color capability. The present color capable flat panel video display may be altered and also used as a black and white display if the interdigital surface electrodes are individually connected to the outputs of each detector in a column of infrared detectors in an infrared viewing device without having additional light amplification. Prior art flat panel displays required additional electronics to enhance the incoming video signal.

Presently known flat panel displays require active electronics at every picture element (PIXEL) site. An example of this is discussed in an article by M. N. Ernstoff of Hughes Aircraft Company, entitled "Liquid Crystal Pictorial Display," 1975 presented at SID Technical Meeting at Culver City, California on Nov. 6, 1975. Other flat panel displays depend on non-linear or thresholding phenomenon, such as an electroluminescent cross grid panel. An example of this phenomenon is discussed in an article entitled, "Computer Compatible Electroluminescent Techniques for the Achievement of Wide Angle Visual Displays," by W. Merel and H. Barkan in IEEE Inter. Conv. Record, 1963.

The present display does not require non-linear thresholding nor electronics at every PIXEL site.

SUMMARY OF THE INVENTION

The present color display is comprised of four functional components. The first functional component is an active, or light emitting, linear electroluminescent display having a plurality of opaque horizontal stripe electrodes on the back side and a common transparent electrode on the front side. The combined horizontal stripe electrodes and the transparent electrode are positioned on opposite sides of vertical color phosphor columns. The columns may be comprised of alternating red, green, and blue colored phosphors. Functionally, when a voltage potential is applied to one horizontal electrode, one horizontal line will be illuminated which is composed of contiguous color spots, alternating between red, green, and blue. The second functional component is a passive, or light modulating, linear display, which is based on electronically induced birefringence in a material such as lanthanum-modified lead zirconate titanate (PLZT). Interdigital vertical surface electrodes may be placed on one, or both sides, of this electronically induced birefringence material. This material and the electrodes thereon are sandwiched between two orthogonal dichroic polarizers. The interdigital vertical electrodes are aligned with the vertical color phosphor columns of the electroluminescent display. The two dichroic polarizers are aligned respectively at +45° and −45° to the electric field produced by voltages applied to the interdigital electrodes. Therefore, when these electrodes are activated, the passive display will exibit light transmission that is uniform in the vertical direction and varying in the horizontal direction preportional to the square of the electric field produced by video signal voltages applied to the interdigitated electrodes. The third functional component is an optically thin dielectric spacer which separates the active and passive linear displays. The spacer is required to electrically isolate the two linear displays while at the same time maintaining approximate optical contact. For small format displays, of say 1 to 3 inches diameter, the above requirements may be satisfied by a flat fiber optic plate. However, for larger formats where the individual PIXELs are larger than a few thousands of an inch a thin glass, or transparent plastic, spacer can be used. In practice the electroluminescent linear display is viewed through both the spacer and the passive electro-birefringent linear display. At any instant in time, one horizontal electrode of the electroluminescent display is activated while the voltages on the vertical interdigital electrodes vary according to the intensity and color information along the corresponding scan line of the input image. By sequencing through all of the horizontal striped electrodes, a full frame of color video information is displayed. The fourth functional component is the electric circuitry necessary to process the incoming information and provide the appropriate electrical signals to the electrodes to produce a display as described above. The particular nature of the circuitry may vary according to the format of the incoming video signal.

IN THE DRAWINGS

The lone FIGURE is a schematic of the present color capable flat panel display.

DESCRIPTION OF THE PREFERRED EMBODIMENT

The present color capable display is comprised of a linear electroluminescent (EL) panel as an active light emitting portion and a passive portion comprised of electrically induced birefringence material having electrodes thereon aligned with various color phosphor columns in the EL panel with orthogonal dichroic polarizers positioned on opposite sides of the birefringence material. The birefringence material may be a lanthanum-modified lead zirconate titanate (PLZT) plate. An example of the present color capable flat panel display, depicted as having 5 by 5 picture elements (PIXELs), is shown in the lone FIGURE. The FIGURE illustrates a television type input flat panel display having three color capability. However, the concept is not limited to color capability but may be used in the monochromatic, or black and white, area wherein the serial-to-parallel horizontal scan electronics 80 is not required to switch voltages on PLZT electrodes 40 and 41 on an individually corresponding color phosphor column to PLZT electrode basis. The EL panel is comprised of a phosphor screen 14, preferably a three component P-22 tri-color phosphor that is sandwiched between a common transparent electrode 16 on a front side thereof and a plurality of opaque horizontal stripe electrodes 12 on the backside thereof. The vertical scan electronic means 10 activates one horizontal stripe electrode 12 one at a time. The sequence of activation follows the sequence of horizontal scan lines in the incoming video signal into the vertical scan electronic means 10. The phosphor in screen 14 is energized by a DC voltage applied to electrodes 12. However, to maintain long life in the electroluminescent panel, the polarity of the activating voltages on electrodes 12 are preferably reversed in polarity each full frame to avoid electron drift within the phosphor. A typical voltage that is easiest to handle for the device is 30 DC volts. Since a higher voltage for activation of the phosphor is preferable, peak-to-peak voltage of 30 volts negative to 30 volts positive may be used. The opaque electrodes 12 may be made from any convenient metal such as copper, aluminum, or nickel. The transparent electrode 16 through which the phosphor light emission passes may be tin oxide, indium oxide, or a thin gold layer. The phosphor may be the three-component P-22 phosphor for red, blue and green color operation, or P-4 phosphor for monochrome operation. In the color capable embodiment shown in the FIGURE the electroluminescent phosphor is divided into vertical stripes of different color phosphor, with each vertical strip ⅓ the horizontal width of a PIXEL. The vertical height of each horizontal stripes electrode 12 is equal to the vertical dimension of a PIXEL.

The second portion, supported on the opposite side of an optically thin dielectric spacer, such as a fiber optic substrate 18 on a thin glass, consists of an electronically induced birefrengent material plate 30, such as lanthanummodified lead zirconate titanate (PLZT) plate having PLZT electrodes 40 and 41 on each side thereof. Each of the PLZT electrodes 40 and 41 are comprised of a common ground electrode and a plurality of interdigital surface electrodes interlaced and parallel with the common ground electrode. The PLZT plate 30 and electrodes 40 and 41 are sandwiched between the two orthogonal linear dichroic polarizers 20 and 50, herein noted respectively as first and second dichroic polarizers. The polarizers may be Polaroid brand HN-32 sheets. Numeral 40*a* represents a common ground potential to the common electrode of each of the interdigital electrodes 40 and 41. All of the other electrodes have voltages applied thereto to induce a birefringence in the PLZT plate in the area lateral to the common ground electrode and the activated electrodes. Numeral 40*c* represents one common connection between two corresponding interdigital surface electrodes 40 and 41 that are both aligned with one of said plurality of vertical color phosphor stripes. Bracket 40*b* illustrates all of the corresponding interdigital surface electrodes of 40 and 41. Each of the plurality of activated interdigital surface electrodes of 40 are aligned with one of the plurality of active interdigital surface electrodes of 41 with both optically aligned with one of said plurality of vertical color phosphor stripes 14. Since only one opaque horizontal stripe electrode is activated at a time, the intersection of the horizontal EL electrode and vertical three consecutive set of PLZT electrodes defines one image element, or PIXEL. The relative voltages applied to each set (of three) of PLZT electrodes determines the color and the voltage applied across the EL phosphor stripe determines the overall intensity of a PIXEL. All PIXELs along one horizontal line are imaged in parallel by activating all the PLZT interdigital electrodes in one scan. The horizontal scan is fed from vertical scan electronic means 10 directly to the serial-to-parallel electronic means 80 along lead 60. The information for the horizontal scan line is fed to all the PLZT electrodes after being converted to parallel by the serial-to-parallel electronic means 80. The sequence of activation of the active display horizontal electrodes 12 follows the sequence of horizontal scan lines in the incoming video signals. The PLZT electrodes 40 and 41 may be any convenient metal, such as gold. The serial-to-parallel electronic means 80 may be comprised of two CCD shift registers with a sample and hold amplifier for each location. In practice, one CCD and its sample and hold amplifiers would determine the sequence of activation on each set of PLZT electrodes 40 and 41, while the video signal for the next horizontal scan line is being fed into the other set of sample and hold amplifiers by the other CCD shift register. An example of the video type, or TV type, sweep is that all odd numbered lines of, say the 515 lines, are swept and stored in the first register and are read out, and are activating the interdigital surface electrodes, while the even numbered lines are stored in the second register, and are then read out while the next odd numbered lines are being entered again, etc. During one frame, of both even and odd numbered lines, the common transparent electrode 16 is at ground potential and the activated opaque horizontal stripe electrodes 12 at any time is electrically positive relative to ground. During the following frame electrode 16 is still at ground potential but electrodes 12 are at a negative potential relative to ground. The voltages on the interdigital surface electrodes will preferably vary from zero potential when there is no signal from the serial-to-parallel electronic means 80 to approximately 6,000 volts per centimeter for full transmission. For a typical format having 500 horizontal, full color, PIXELs, and with the distance between the interdigital surface electrodes and the common ground electrode of 40 micrometers, this voltage reduces the signal voltages of from zero volts to about 25 DC volts. In the case of larger formats where voltage restrictions might become a problem, more than one interdigital surface electrode may be used per PIXEL.

This display may be simplified for monochrome operation. Instead of having separate voltages applied to every third of electrodes 40 and 41 for color operation, all three electrodes may be switched simultaneously.

Among the advantages of this device is the capability of the monochrome version to operate directly from the output of a modular forward looking infrared device (FLIR) with no additional multiplexing required, and therefore the serial-to-parallel electronic means 80 eliminated. For this operation, the plane of polarization of the device should be rotated 90° from the three color version described herein above wherein the opaque stripe electrodes are now vertical and the interdigital electrodes are horizontal. One opaque stripe electrode of the active display is on at any instant as in the color display, but the activated scan line corresponds to the horizontal position of the infrared detector column in the field of view of the FLIR. The output signal from each of the infrared detectors in the column is connected directly to a corresponding horizontal interdigital surface electrode for controlling the transmission of the image from the FLIR. The serial-to-parallel electronic means 80 is not needed at all in this monochrome version of operation. Also, by using the PLZT plates with the two dischroic polarizers the display may be enlarged from the previous displays that have used microchannel plates. The enlargement can easily be up to a 12 to 15 inch diameter display from the limit of about 3 inches diameter of the microchannel plate display.

Even though only one preferred color embodiment and a monochromatic embodiment are disclosed, obviously other modifications and variations are possible in the light of the above teaching. It is the intention, therefore, to be limited only as indicated by the scope of the following claims.

I claim:

1. A color capable electroluminescent flat panel display comprised of:

an optically thin dielectric spacer;

an active light emitting linear electroluminescent panel comprised of a phosphor screen having a plurality of vertical color phosphor stripes with a plurality of opaque horizontal stripe electrodes on the back side thereof and a common transparent electrode on the front side thereof wherein said common transparent electrode is contiguous with an input side of said optically thin dielectric spacer and wherein said active light emitting electroluminescent panel produces a horizontal scan pattern of various color dots therefrom in accordance with incoming video signals;

vertical scan electronic means for selectively activating said opaque horizontal stripe electrodes in sequence with said incoming video signals entering said vertical scan electronic means;

a passive light transmitting portion on an output side of said optically thin dielectric spacer for modulating said video signals emitted from said active light emitting portion through said optically thin dielectric spacer, said passive light transmitting portion comprised of an electrically induced birefrengent material plate having a plurality of linear interdigital surface electrodes alternately between a common ground electrode on each side thereof with said plate and electrodes sandwiched between first and second orthogonal linear dichroic polarizer plates on an output side of said optically thin dielectric spacer with said plurality of interdigital surface electrodes optically aligned with said plurality of vertical color phosphor stripes of said active light emitting portion; and serial-to-parallel horizontal scan electronic means for applying information on a sequentially scan line basis from one scan line of said incoming video signals into a scan of voltages on all of said plurality of interdigital surface electrodes to vary the transmission of the image from the said one scan line of said active light emitting portion to a display according to the intensity and color information along the said one scan line.

2. A display as set forth in claim 1 wherein said optically thin dielectric spacer is a fiber optic faceplate.

3. A display as set forth in claim 1 wherein said optically thin dielectric spacer is a thin glass.

4. A display as set forth in claim 2 wherein said plurality of vertical color phosphor stripes are divided into stripes of different color phosphor with each of said vertical stripes being one-third the horizontal width of a PIXEL and the vertical height of each of said horizontal electrode stripes being equal to the vertical dimension of a PIXEL.

5. A display as set forth in claim 2 wherein said plurality of vertical phosphor stripes is a three color component P-22 type phosphor for color operation.

6. A display as set forth in claim 5 wherein said electronically induced birefrengent material plate is a PLZT plate.

7. A display as set forth in claim 6 wherein said plurality of interdigital surface electrodes are made of gold.

8. A display as set forth in claim 7 wherein said first and second orthogonal linear dichroic polarizer plates are Polaroid brand HN-32 sheets.

9. A display as set forth in claim 8 wherein said scan of voltages on said plurality of interdigital surface electrodes is at ground potential during inactivation and is at +25 DC volts during activation and each of said interdigital surface electrodes are parallel to said common ground electrodes on each side thereof and are approximately 40 micrometers apart for 500 horizontal PIXELs and wherein said first orthogonal linear dichroic polarizer plate is aligned at +45° angle to the electric field produced between the activated interdigital surface electrode and the adjacent common ground electrodes and said second orthogonal linear dichroic polarizer plate is aligned at −45° angle to said electric field whereby transmission of the image from said electroluminescent panel is blocked where said interdigital surface electrode is inactivated and the electrically induced birefrengence between the activated interdigital surface electrode and adjacent common ground electrodes causes the linearly polarized output from said first dichroic polarlizer to become circularly polarized whereby transmission of the image from said active display will vary along the horizontal scan line according to the signal on the video scan line that is activating voltages on all of said plurality of interdigital surface electrodes.

10. A display as set forth in claim 9 wherein said serial-to-parallel horizontal scan electronic means is comprised of two charge coupled device shift registers having sample and hold amplifiers for each location wherein said sample and hold on each charge coupled device activates said interdigital surface electrodes simultaneously as the next horizontal video scan line is being fed into the other set of sample and hold amplifiers by the other charge coupled shift register.

11. A display as set forth in claim 10 wherein said plurality of opaque horizontal stripe electrodes are made of copper.

12. A display as set forth in claim 10 wherein said plurality of opaque horizontal stripe electrodes are made of aluminum.

13. A display as set forth in claim 10 wherein said plurality of opaque horizontal stripe electrodes are made of nickel.

14. A display as set forth in claim 10 wherein said common transparent electrode is made of tin oxide.

15. A display as set forth in claim 10 wherein said common transparent electrode is made of indium oxide.

* * * * *